United States Patent [19]
Irvine

[11] Patent Number: 6,079,523
[45] Date of Patent: Jun. 27, 2000

[54] BICYCLE HAND BRAKE

[76] Inventor: Mark W. Irvine, 55 Bingham Cir., Sacramento, Calif. 95831-4736

[21] Appl. No.: 09/094,843

[22] Filed: Jun. 15, 1998

Related U.S. Application Data

[63] Continuation-in-part of application No. 29/076,335, Sep. 17, 1997.

[51] Int. Cl.[7] ........................................... B62L 3/00
[52] U.S. Cl. ........................... 188/24.21; 188/24.12; 188/24.22
[58] Field of Search ............... 188/24.12, 24.21 OR, 188/24.11, 24.22, 24.15, 24.16; 74/502.4, 502.6; D12/179

[56] References Cited

U.S. PATENT DOCUMENTS

| | | | |
|---|---|---|---|
| 3,870,127 | 3/1975 | Wilson et al. | 188/24.15 |
| 4,480,720 | 11/1984 | Shimano | 188/24.22 |
| 4,838,387 | 6/1989 | Yoshigai . | |
| 5,012,900 | 5/1991 | Ishibashi . | |
| 5,562,185 | 10/1996 | Chen . | |
| 5,564,531 | 10/1996 | Lumpkin . | |
| 5,636,716 | 6/1997 | Sugimoto | 188/24.22 |
| 5,655,630 | 8/1997 | Sugimoto | 188/24.22 |
| 5,788,019 | 8/1998 | Lee et al. | 188/24.21 |

*Primary Examiner*—Robert J. Oberleitner
*Assistant Examiner*—Thomas J. Williams
*Attorney, Agent, or Firm*—Pitts & Brittian, P.

[57] ABSTRACT

A bicycle hand brake assembly designed to include minimal parts in order to reduce risk of failure of the entire brake system as a result of failure of one of the parts. The assembly includes first and second brake arms disposed on either side of the bicycle frame. Each of the first and second brake arms defines a lower end which is pivotally mounted to the bicycle frame on either side of a wheel. A brake pad mount is mounted to each of the first and second brake arms for mounting a brake pad thereto via mounting screws such that it may be replaced in the event of failure, or may be reversed to improve clearance and/or generate a varied braking force. The first brake arm defines an upper end terminating above an upper end of the second brake arm, and at an approximate center line of the assembly. The second brake arm terminates at a point approximately above the lower end thereof. A first brake cable slot is defined by the upper end of the first brake arm for receiving a portion of the brake cable. The second brake arm defines a second brake cable slot for receiving a portion of the brake cable. Both the first and second brake cable slots are configured to be in alignment when the assembly is mounted on a bicycle, thereby allowing the brake cable to be routed directly from the first brake arm to the second brake arm without requiring any bending thereof. This arrangement eliminates cable guides, linkages and cable hangers, reduces cable function, eliminates moving parts and improves clearance while generating improved braking force.

18 Claims, 3 Drawing Sheets

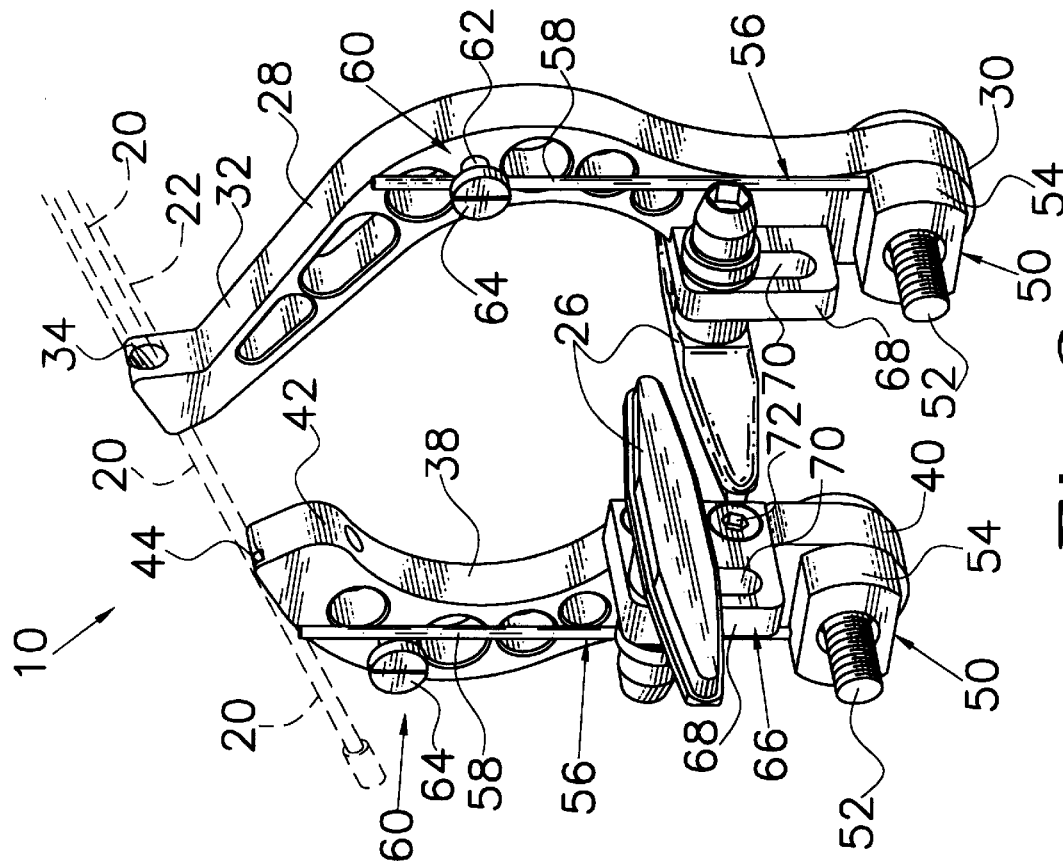
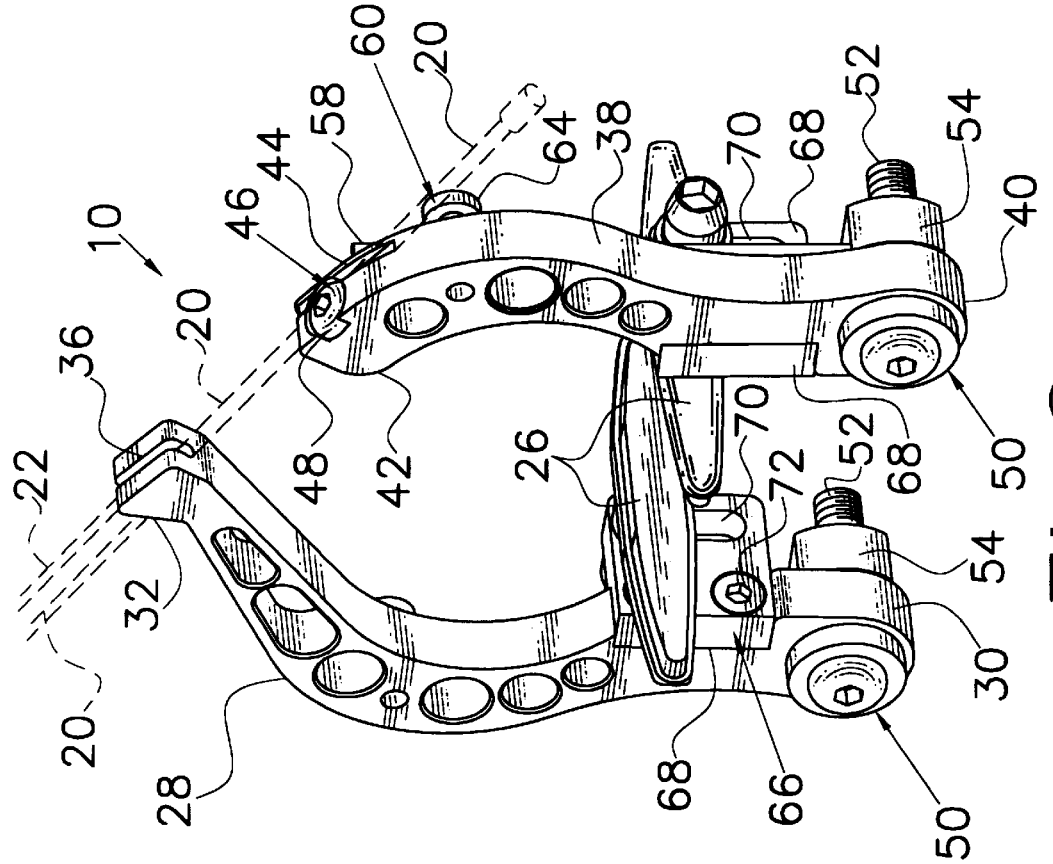
Fig. 2
Fig. 3

BICYCLE HAND BRAKE

This application is a continuation-in-part of my earlier filed pending application Ser. No. 29/076,335, filed Sep. 17, 1997.

DESCRIPTION

1. Technical Field

This invention relates to the field of bicycles. More specifically, the present invention is related to an improved hand brake for a bicycle.

2. Background Art

In the field of bicycles, it is well known that various types of hand brakes are available for use in braking a bicycle. Of the various types of hand brakes, most can be classified into one of two categories including center-pull caliper brakes and side-pull caliper brakes. In either of these types of brakes, the objective is for the rider to be able to pull on a lever attached to the handle bars, which in turn pulls a cable which ultimately serves to pull brake pads disposed on either side of wheel into engagement with the rim in order to slow or eventually stop the bicycle.

As indicated, there are various arrangements of bicycle hand brakes that are and have been available to the public. Typical of the art are those devices disclosed in the following U.S. Pat. Nos.:

| U.S. Pat. No. | Inventor(s) | Issue Date |
| --- | --- | --- |
| 4,480,720 | K. Shimano | Nov. 6, 1984 |
| 4,838,387 | K. Yoshigai | June 13, 1989 |
| 5,012,900 | H. Ishibashi | May 7, 1991 |
| 5,562,185 | Z. M. Chen | Oct. 8, 1996 |
| 5,564,531 | W. R. Lumpkin | Oct. 15, 1996 |
| 5,636,716 | M. Sugimoto, et al. | June 10, 1997 |
| 5,655,630 | M. Sugimoto | Aug 12, 1997 |

Of these patents, the '720 patent issued to Shimano is a brake operating device designed to apply a greater amount of braking force to the rear brake of a bicycle upon activation of the brakes, and then a greater amount of braking force to the front brakes thereafter. Obviously, the '720 device is provided for a braking system for a bicycle wherein both the front and rear brakes are activated simultaneously. However, it is well known that conventional bicycles have independently operated front and rear brakes.

Typical of the conventional center-pull type brake actuators is disclosed by Yoshigai in the '387 patent. Typically a pair of brake arms are pivotally connected to each other and the bicycle frame at a center point on the brake arms. The brake arms are connected in an "X" configuration and a cable links the upper ends of each of the brake arms. Thus, an upward force on the center of the cable link causes a scissor or plier-type movement of the brake arms, moving the lower ends of the brake arms toward each other, and more particularly, toward the rim of the wheel. Brake pads attached to the lower end of each of the brake arms thus engage the wheel rim in order to apply a braking force thereto.

Ishibashi, in the '900 patent, discloses a conventional side-pull braking system. The side pull braking system is similar to the center-pull system with the exception that the braking arms are not substantially identical, providing a mechanism for applying a braking force to the brake arms from the side as opposed to from the center. To effectuate this, a linking mechanism is provided between the two brake arms. However, both of the conventional center-pull and side-pull brake systems suffer from common deficiencies. Namely, because they are secured to the bicycle frame at one location, they have a tendency to rotate about that point. This may occur due to several reasons, but the effect is that one brake pad may be left in contact with the wheel rim after applying a braking force, thus rendering the bicycle inoperable, or at least applying a constant braking force thereto. Obviously, a result of the latter is more difficult operation of the bicycle and excessive wear of the brake pads. Another deficiency of each of these braking systems is that they are comprised of a number of individual parts rendering them complicated to install, adjust and maintain.

A new generation of the center- and side-pull braking systems is illustrated in the remaining patents cited. The remaining patents illustrate various brakes commonly referred to as "V-brakes" wherein each of two brake arms are pivotally mounted at the lower end thereof to one side of the bicycle frame. A centrally mounted brake pad is brought into contact with the wheel rim by a braking force applied to the upper end of the braking arm in a direction toward the wheel. Each brake arm is typically provided with a biasing device at the point of connection to the bicycle frame in order to normally bias the brake arm away from the wheel. Therefore, problems associate with one or the other brake pad remaining in contact with the wheel rim are eliminated or at least greatly reduced. However, problems are created with respect to the routing of the brake cable from a brake actuator typically mounted on the handle bars of the bicycle.

Illustrated in the '531 patent issued to Lumpkin illustrates a center-pull type V-brake. The '531 device includes two brake arms defining mirror image configurations of each other. While problems regarding the rotation of the braking system with respect to the bicycle frame have been overcome, problems associated with the number of parts, the ease of installation, and the adjustment thereof are still present.

The '716 and '630 devices disclosed by Sugimoto, et al., and Sugimoto, respectively, illustrate side-pull type V-brake assemblies. Each of these devices also includes a pair of brake arms defining mirror images of each other. In each of these devices, the lower end of the brake cable casing is deformed to define a curved configuration for directing the brake cable from the brake lever either to a linkage between the two brake arms (the '716 patent) or to a first of the brake arms (the '630 patent) and ultimately to the second of the two brake arms. Due to the flexure of the brake cable during each application and release of the brakes, such deformation of the brake cable and brake calve casing is undesirable.

Other similar braking systems are illustrated in *Performance Elite*, Summer 1997 catalog, front and back covers and page G (items A, F, G and I); and *TBG Cycle Action, Tradewinds*, 1997 Show Issue catalog, front and back covers and pages 6; 29 (Lee Chi's V-type PX-2, and Tektro Technology Corporation brake model 912A), 140 (N900A, 1000A, 809P and 809A); 141 (MX1); and 142 (993A, 993P, 994A, 995A, 996A, and 997A). Several of these, for example items 993A and 995A on page 142 of the *TBG* reference, include curved guides in lieu of bending the end of the brake cable casing. However, this does not solve the problems regarding the bending of the cable itself, and the forces exerted on the braking system as a result.

Also illustrated in the *TBG* reference on page 142 thereof are two devices (items 996A and 997A) which include an attachment at the top of one of the brake arms which includes a pulley type wheel for receiving the brake cable and to facilitate directing the cable to the second brake arm. Although assisting in bending the cable and reducing friction associated with the cable sliding through the guides of the previously discussed embodiments, the cable remains in a curved configuration, leading to its failure after a period of use.

Therefore, it is an object of this invention to provide an improved bicycle hand brake including minimal parts in order to reduce risk of failure of the entire brake system as a result of failure of one of the parts.

Another object of the present invention is to provide a bicycle hand brake system whereby the brake cable and associated casing are directed from the brake lever directly to both of the brake arms without requiring a significant bend therein, thereby reducing the risk of failure of the brake cable.

DISCLOSURE OF THE INVENTION

Other objects and advantages will be accomplished by the present invention which is designed to include minimal parts in order to reduce risk of failure of the entire brake system as a result of failure of one of the parts. Moreover, the assembly of the present invention is designed to provide a bicycle hand brake system whereby the brake cable and associated casing are directed from the brake lever directly to both of the brake arms without requiring a significant bend therein, thereby reducing the risk of failure of the brake cable.

The assembly of the present invention may be mounted on either the front or rear wheel, and may be reversed in orientation on either wheel. The assembly includes first and second brake arms disposed on either side of the bicycle frame. A conventional brake handle is mounted on the bicycle handle bar. A conventional brake cable is received within a casing and extends between the brake handle, to the first brake arm, to the second brake arm, and terminates at a distal end beyond the second brake arm. The brake cable casing extends between the brake handle and the first brake arm.

Each of the first and second brake arms defines a lower end which is pivotally mounted to the bicycle frame on either side of a wheel. First and second mounting devices are provided for accomplishing the securement of each of the first and second brake arms to the frame, respectively. Each mounting device of the illustrated embodiment includes a threaded bolt received through the lower end of the respective brake arm and is configured to engage a threaded receptor defined by the bicycle frame. A biasing device including a return spring is provided for biasing the brake arm away from the bicycle wheel.

A brake pad mount is mounted to each of the first and second brake arms for mounting a brake pad thereto. The brake pad mount includes a bracket defining a slotted opening. The slotted opening is provided for adjusting the height of the brake pad. The bracket is removably mounted via mounting screws such that it may be replaced in the event of failure, or may be reversed to improve clearance and/or generate a varied braking force.

The first brake arm of the preferred embodiment is configured to define an upper end terminating above and upper end of the second brake arm, and at an approximate center line of the assembly. The second brake arm, however, terminates at a point approximately in vertical alignment above the lower end thereof. A first brake cable slot is defined by the upper end of the first brake arm for receiving a portion of the brake cable. A brake cable casing receptor is further defined by the upper end of the first brake arm for receiving the end of the brake cable casing. The second brake arm defines a second brake cable slot for receiving a portion of the brake cable. Both the first and second brake cable slots are configured such that when the assembly is mounted on a bicycle, the first and second brake cable slots are in alignment, thereby allowing the brake cable to be routed directly from the first brake arm to the second brake arm without requiring any bending thereof. This arrangement eliminates cable guides, linkages and cable hangers, reduces cable friction, eliminates moving parts and improves clearance while generating improved braking force.

BRIEF DESCRIPTION OF THE DRAWINGS

The above mentioned features of the invention will become more clearly understood from the following detailed description of the invention read together with the drawings in which:

FIG. 2 is a perspective view of the bicycle hand brake of the present invention from the front thereof and shown removed from a bicycle;

FIG. 3 is a perspective view of the bicycle hand brake of the present invention shown from the rear thereof.

BEST MODE FOR CARRYING OUT THE INVENTION

Figure 1:
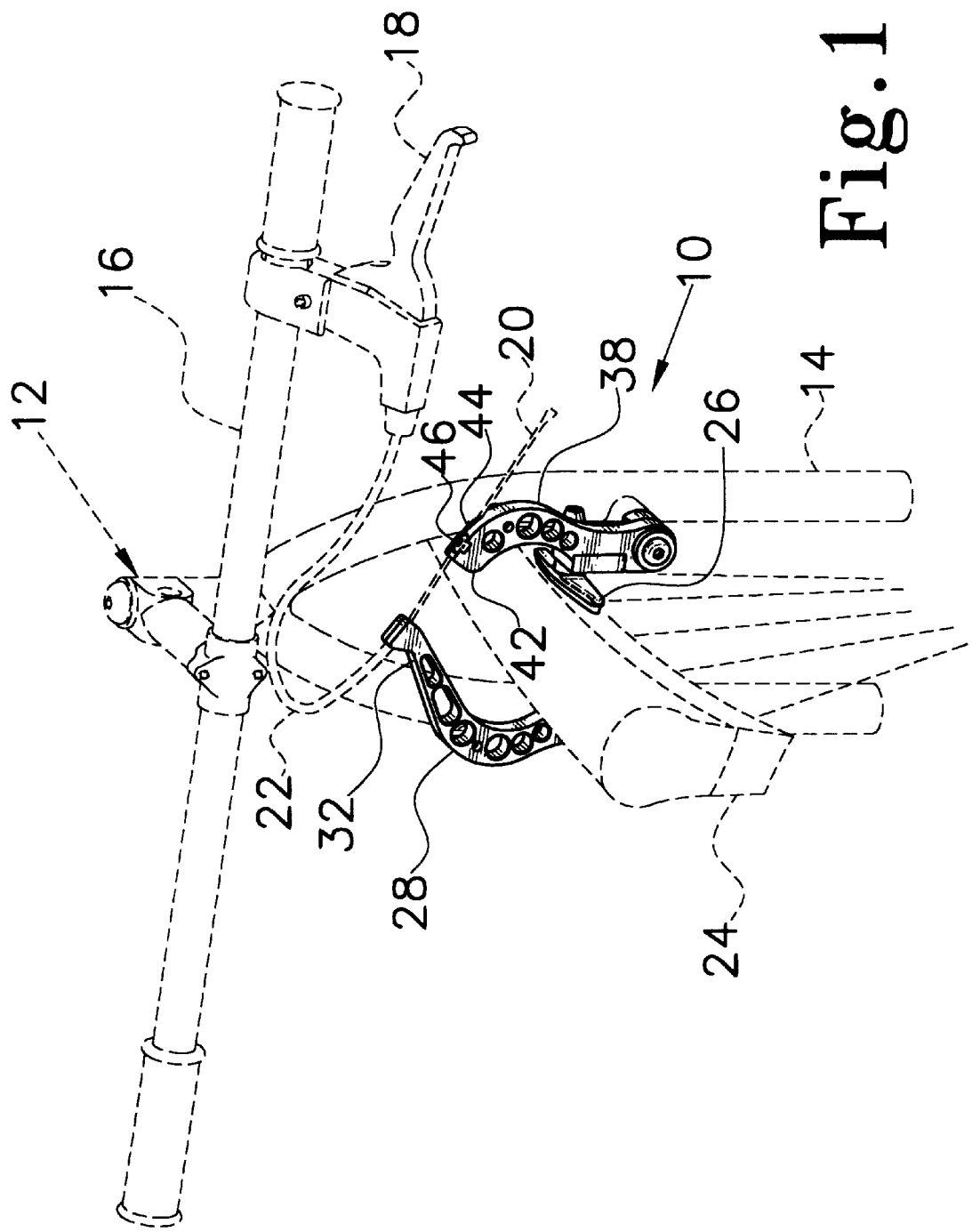
FIG. 1 is a perspective view of the bicycle hand brake constructed in accordance with several features of the present invention shown mounted on a bicycle.

A bicycle hand brake assembly incorporating various features of the present invention is illustrated generally at 10 in the figures. The bicycle hand brake assembly, or assembly 10, is designed to include minimal parts in order to reduce risk of failure of the entire brake assembly 10 as a result of failure of one of the parts. Moreover, the assembly 10 of the present invention is designed to provide a bicycle hand brake system whereby the brake cable 20 and associated casing 22 are directed from the brake handle 18 directly to both of the brake arms 28,38 without requiring a significant bend therein, thereby reducing the risk of failure of the brake cable 20.

Illustrated in FIG. 1 is an assembly 10 of the present invention shown mounted to the front of a bicycle 12. It will be understood that the assembly 10 may be mounted to be used in association with either the front or rear wheel 24, and typically with both. The assembly includes first and second brake arms 28,38 disposed on either side of the bicycle frame 14. A conventional brake handle 18 is mounted on the bicycle handle bar 16. A conventional brake cable 20 is received within a casing 22 and extends between the brake handle 18, to the first brake arm 28, to the second brake arm 38, and terminates at a distal end beyond the second brake arm 38. The brake cable casing 22 extends between the brake handle 18 and the first brake arm 28, as will be more thoroughly described below.

Each of the first and second brake arms 28,38 defines a lower end 30,40, respectively, which is pivotally mounted to the bicycle frame 14 on either side of a wheel 24. As more clearly illustrated in FIGS. 2 and 3, a mounting device 50 is provided for accomplishing the securement of each of the first and second brake arms 28,38 to the frame 14. Each mounting device 50 of the illustrated embodiment includes a threaded bolt 52 received through the lower end 30,40 of the respective brake arm 28,38 and is configured to engage a threaded receptor (not shown) defined by the bicycle frame 14. A spacer 54 is disposed between the brake arm 28,38 and the bicycle frame 14. The mounting device 50 is configured such that once the bolt 52 is tightened onto the bicycle frame 14, the brake arm 28,38 is allowed to pivot about the bolt 52 while the spacer 54 is fixed. A return spring 56 is carried within the spacer 54 and defines an engagement member 58 extending upwardly therefrom, toward an upper end 32,42 of the brake arm 28,38. A locking mechanism 60 is provided for fixing the return spring engagement member 58 to the brake arm 28,38. In the illustrated embodiment, the locking mechanism 60 is simply a threaded screw 62 having a head 64 configured to engage the engagement member 58 such that when the screw 62 is tightened, the engagement member 58 is tightly positioned between the screw head 64 and the brake arm 28,38. Therefore, when the brake arm 28,38 is rotated toward the bicycle wheel 24 and then released, the return spring 56 biases the brake arm 28,38 back to its original position, away from the wheel 24.

Disposed above the mounting device 50 is a brake pad mount 66. The brake pad mount 66 includes a bracket 68 defining a slotted opening 70. The bracket 68 is disposed orthogonally to the brake arm 28,38 and parallel to a plane defined by the wheel 24. The slotted opening 70 is oriented in a direction substantially parallel to a radius of the wheel 24. Accordingly, the height of a brake pad 26 mounted on the brake arm 28,38 is adjustable to ensure proper contact with the rim of the wheel 24. Conventional brake pads 26 are mounted on the bracket 68. The bracket 68 of the preferred embodiment is removably mounted via mounting screws 72 such that it may be replaced in the event of failure. Further, the bracket 68 is configured to be reversible in order to improve clearance and/or to generate a varied braking force. Specifically, moving the brake pads 26 away from the mounting devices 50 creates a natural flex in the frame 14. However, it will be understood that the bracket 68 may alternatively be integrally formed with the brake arm 28,38.

Figure 4:
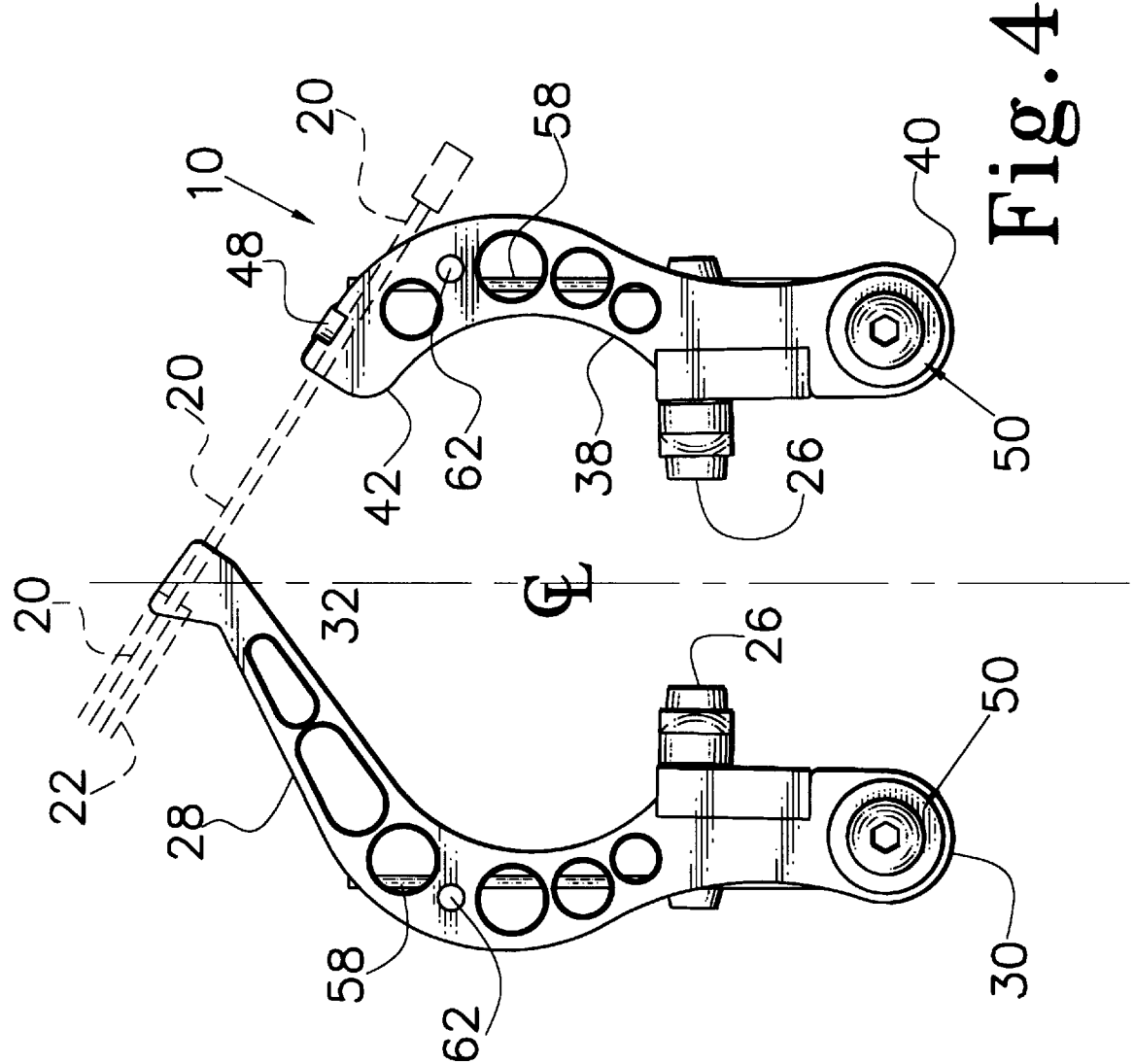
FIG. 4 illustrates a front elevation view of the bicycle hand brake of the present invention.

As most clearly illustrated in FIG. 4, the first brake arm 28 of the preferred embodiment is configured to define an upper end 32 terminating above an upper end 42 of the second brake arm 38, and at an approximate center line of the assembly 10. The second brake arm 38, however, defines an upper end 42 disposed at a point approximately above the lower end 40 thereof. A first brake cable slot 36 is defined by the upper end 32 of the first brake arm 28 for receiving a portion of the brake cable 20. A brake cable casing receptor 34 is further defined by the upper end 32 of the first brake arm 28 for receiving the end of the brake cable casing 22. To this extent, the first brake cable slot 36 initiates at the brake cable casing receptor 34, opens on the outside surface of the first brake arm 28 toward the second brake arm 38, and is configured to be smaller than the brake cable casing receptor 34 in order to serve as a stop for the brake cable casing 22. The second brake arm 38 defines a second brake cable slot 44 for receiving a portion of the brake cable 20. Both the first and second brake cable slots 36,44 are configured such that when the assembly 10 is mounted on a bicycle 12, the first and second brake cable slots 36,44 are aligned, thereby allowing the brake cable 20 to be routed directly from the first brake arm 28 to the second brake arm 38 without requiring any bending thereof. This arrangement eliminates cable guides, linkages and cable hangers, reduces cable friction, eliminates moving parts and improves clearance while generating improved braking force.

In order to maintain the position of the brake cable 20 in the second brake arm 38, and to allow for adjustability of the tension in the brake cable 20, an adjustment screw 46 is provided. The adjustment screw 46 is disposed at the edge of the second brake cable slot 44 and defines a head 48 such that when the adjustment screw 46 is tightened, the brake cable 20 is secured between the adjustment screw head 48 and the second brake arm 38.

From the foregoing description, it will be recognized by those skilled in the art that a bicycle hand brake assembly offering advantages over the prior art has been provided. Specifically, the assembly provides a bicycle hand brake having minimal parts in order to maximize efficiency and reduce risk of failure. Further, due to the configuration of the first and second brake arms, the brake cable is routed directly from the brake handle, to the first brake arm, and secured to the second brake arm. While this arrangement provides direct cabling and reduces the number of parts required, the assembly of the present invention also reduces wear on the brake cable itself as a result of reduced friction.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A bicycle hand brake assembly for use with a conventional bicycle having a frame, a front wheel, a rear wheel, at least one brake handle, and at least one brake cable received within a brake cable casing, the brake cable and brake cable casing being conventionally mounted at a proximal end to the brake handle, said bicycle hand brake comprising:

a first brake arm mounted on the bicycle frame proximate a first side of either of the bicycle front and rear wheels, said first brake arm being configured to define a lower end and an upper end, said first brake arm defining a substantially rigid construction between said lower end and said upper end, said upper end being disposed at an elevation above the bicycle wheel and at an approximate center line defined by said assembly, said first brake arm upper end defining a brake cable casing receptor for receiving a distal end of the brake cable casing and a firs brake cable slot for receiving a portion of the brake cable, said first brake cable slot initiating at said brake cable casing receptor and opening on an outside surface of said first brake arm;

a second brake arm mounted on the bicycle frame proximate a second side of either of the bicycle front and rear wheels and in alignment with said first brake arm, said second brake arm being configured to define a lower end and an upper end, said upper end being disposed at an elevation below said first brake arm upper end and approximately vertically aligned with said lower end, said second brake arm defining a second brake cable slot for receiving a portion of the brake cable, said first brake cable slot and said second brake cable slot each being oriented to be in alignment when said bicycle hand brake assembly is mounted on a bicycle, thereby allowing the brake cable to be routed directly from said first brake arm to said second brake arm without requiring any bending thereof;

a first mounting assembly for mounting said first brake arm to the bicycle; and a second mounting assembly for mounting said second brake arm to the bicycle.

2. The bicycle hand brake assembly of claim 1 wherein said second brake arm further includes an adjustment device for adjustably securing the brake cable thereto.

3. The bicycle hand brake assembly of claim 2 wherein said adjustment device includes an adjustment screw disposed at an edge of said second brake cable slot and defining a head configured such that when said adjustment screw is tightened, the brake cable is secured between said adjustment screw head and said second brake arm.

4. The bicycle hand brake assembly of claim 1 wherein:

said first mounting device includes a first bolt received through said first brake arm lower end and configured to engage the bicycle frame, a first spacer disposed between the first brake arm and the bicycle frame, said first mounting device being configured such that when said first bolt is tightened onto the bicycle frame, said first brake arm is allowed to pivot about said first bolt while said first spacer is fixed relative to the bicycle frame; and said second mounting device includes a second bolt received through said second brake arm lower end and configured to engage the bicycle frame, a second spacer disposed between the second brake arm and the bicycle frame, said second mounting device being configured such that when said second bolt is tightened onto the bicycle frame, said second brake arm is allowed to pivot about said second bolt while said second spacer is fixed relative to the bicycle frame.

5. The bicycle hand brake assembly of claim 4 wherein:

said first mounting assembly further includes a first biasing device including a first return spring carried within said first spacer and a first locking mechanism, said first return spring including a first engagement member extending upwardly from said first spacer and toward said first brake arm upper end, said first locking mechanism including a first screw configured to be mounted on said first brake arm and having a first head configured to engage said first engagement member such that when said first screw is tightened, said first engagement member is tightly positioned between said first screw head and said first brake arm such that when said first brake arm is rotated toward the bicycle wheel and then released, said first return spring biases said first brake arm to an initial position; and said second mounting assembly further includes a second biasing device including a second return spring carried within said second spacer and a second locking mechanism, said second return spring including a second engagement member extending upwardly from said second spacer and toward said second brake arm upper end, said second locking mechanism including a second screw configured to be mounted on said second brake arm and having a second head configured to engage said second engagement member such that when said second screw is tightened, said second engagement member is tightly positioned between said second screw head and said second brake arm such that when said second brake arm is rotated toward the bicycle wheel and then released, said second return spring biases said second brake arm to an initial position.

6. The bicycle hand brake assembly of claim 1 further comprising:

a first brake pad mount carried by said first brake mount above said lower end, said first brake pad mount including a first bracket defining a first slotted opening, said first bracket being disposed orthogonally to said first brake arm and parallel to a plane defined by the wheel, said first slotted opening being oriented in a direction substantially parallel to a radius of the bicycle wheel, said first slotted opening being configured to adjustably mount a conventional brake pad; and a second brake pad mount carried by said second brake mount above said lower end, said second brake pad mount including a second bracket defining a second slotted opening, said second bracket being disposed orthogonally to said second brake arm and parallel to a plane defined by the wheel, said second slotted opening being oriented in a direction substantially parallel to a radius of the bicycle wheel, said second slotted opening being configured to adjustably mount a conventional brake pad.

7. The bicycle hand brake assembly of claim 6 wherein said first brake pad mount is removably secured to said first brake arm and wherein said second brake pad mount is removably secured to said second brake arm.

8. A bicycle hand brake assembly for use with a conventional bicycle having a frame, a front wheel, a rear wheel, at least one brake handle, and at least one brake cable received within a brake cable casing, the brake cable and brake cable casing being conventionally mounted at a proximal end to the brake handle, said bicycle hand brake comprising:

a first brake arm mounted on the bicycle frame proximate a first side of either of the bicycle front and rear wheels, said first brake arm being configured to define a lower end and an upper end, said first brake arm defining a substantially rigid construction between said lower end and said upper end, said upper end being disposed at an elevation above the bicycle wheel and at an approximate center line defined by said assembly, said first brake arm upper end defining a brake cable casing receptor for receiving a distal end of the brake cable casing and a first brake cable slot for receiving a portion of the brake cable, said first brake cable slot initiating at said brake cable casing receptor and opening on an outside surface of said first brake arm;

a second brake arm mounted on the bicycle frame proximate a second side of either of the bicycle front and rear wheels and in alignment with said first brake arm, said second brake arm being configured to define a lower end and an upper end, said upper end being disposed at an elevation below said first brake arm upper end and approximately vertically aligned with said lower end, said second brake arm defining a second brake cable slot for receiving a portion of the brake cable, said first brake cable slot and said second brake cable slot each being oriented to be in alignment when said bicycle hand brake assembly is mounted on a bicycle, thereby allowing the brake cable to be routed directly from said first brake arm to said second brake arm without requiring any bending thereof, said second brake arm further including an adjustment device for adjustably securing the brake cable thereto;

a first mounting assembly for mounting said first brake arm to the bicycle, said first mounting device including a first bolt received through said first brake arm lower end and configured to engage the bicycle frame, a first spacer disposed between the first brake arm and the bicycle frame, said first mounting device being configured such that when said first bolt is tightened onto the bicycle frame, said first brake arm is allowed to pivot about said first bolt while said first spacer is fixed relative to the bicycle frame;

a second mounting assembly for mounting said second brake arm to the bicycle, said second mounting device including a second bolt received through said second brake arm lower end and configured to engage the bicycle frame, a second spacer disposed between the second brake arm and the bicycle frame, said second mounting device being configured such that when said second bolt is tightened onto the bicycle fame, said second brake arm is allowed to pivot about said second bolt while said second spacer is fixed relative to the bicycle frame;

a first brake pad mount carried by said first brake mount above said lower end, said first brake pad mount including a first bracket defining a first slotted opening, said first bracket being disposed orthogonally to said first brake arm and parallel to a plane defined by the wheel, said first slotted opening being oriented in a direction substantially parallel to a radius of the bicycle wheel, said first slotted opening being configured to adjustably mount a conventional brake pad; and a second brake pad mount carried by said second brake mount above said lower end, said second brake pad mount including a second bracket defining a second slotted opening, said second bracket being disposed orthogonally to said second brake arm and parallel to a plane defined by the wheel, said second slotted opening being oriented in a direction substantially parallel to a radius of the bicycle wheel, said second slotted opening being configured to adjustably mount a conventional brake pad.

9. The bicycle hand brake assembly of claim 8 wherein said adjustment device includes an adjustment screw disposed at an edge of said second brake cable slot and defining a head configured such that when said adjustment screw is tightened, the brake cable is secured between said adjustment screw head and said second brake arm.

10. The bicycle hand brake assembly of claim 8 wherein:
said first mounting assembly further includes a first biasing device including a first return spring carried within said first spacer and a first locking mechanism, said first return spring including a first engagement member extending upwardly from said first spacer and toward said first brake arm upper end, said first locking mechanism including a first screw configured to be mounted on said first brake arm and having a first head configured to engage said first engagement member such that when said first screw is tightened, said first engagement member is tightly positioned between said first screw head and said first brake arm such that when said first brake arm is rotated toward the bicycle wheel and then released, said first return spring biases said first brake arm to an initial position; and said second mounting assembly further includes a second biasing device including a second return spring carried within said second spacer and a second locking mechanism, said second return spring including a second engagement member extending upwardly from said second spacer and toward said second brake arm upper end, said second locking mechanism including a second screw configured to be mounted on said second brake arm and having a second head configured to engage said second engagement member such that when said second screw is tightened, said second engagement member is tightly positioned between said second screw head and said second brake arm such that when said second brake arm is rotated toward the bicycle wheel and then released, said second return spring biases said second brake arm to an initial position.

11. The bicycle hand brake assembly of claim 8 wherein said first brake pad mount is removably secured to said first brake arm and wherein said second brake pad mount is removably secured to said second brake arm.

12. A bicycle hand brake assembly for use with a conventional bicycle having a frame, a front wheel a rear wheel at least one brake handle, and at least one brake cable received within a brake cable casing, the brake cable and brake cable casing being conventionally mounted at a proximal end to the brake handle, said bicycle hand brake comprising:

a first brake arm mounted on the bicycle frame proximate a first side of either of the bicycle front and rear wheels, said first brake arm being configured to define a lower end and an upper end, said first brake arm defining a substantially rigid construction between said lower end and said upper ends said upper end being disposed at an elevation above the bicycle wheel and at an approximate center line defined by said assembly, said first brake arm upper end defining a brake cable casing receptor for receiving a distal end of the brake cable casing and a first brake cable slot for receiving a portion of the brake cable, said first brake cable slot initiating at said brake cable casing receptor and opening on an outside surface of said first brakearm;

a second brake arm mounted on the bicycle frame proximate a second side of either of the bicycle front and rear wheels and in alignment with said first brake arm said second brake arm being configured to define a lower end and an upper end, said upper end being disposed at an elevation below said first brake arm upper end and approximately vertically aligned with said lower end, said second brake arm defining a second brake cable slot for receiving a portion of the brake cable, said first brake cable slot and said second brake cable slot each being oriented to be in alignment when said bicycle hand brake assembly is mounted on a bicycle, thereby allowing the brake cable to be routed directly from said first brake arm to said second brake arm without requiring any bending thereof, said second brake arm further including an adjustment device for adjustably securing the brake cable thereto, said adjustment device including an adjustment screw disposed at an edge of said second brake cable slot and defining a head configured such that when said adjustment screw is tightened, the brake cable is secured between said adjustment screw head and said second brake arm;

a first mounting assembly for mounting said first brake arm to the bicycle, said first mounting device including a first bolt received through said first brake arm lower end and configured to engage the bicycle fame, a first spacer disposed between the first brake arm and the bicycle frame, said first mounting device being configured such that when said first bolt is tightened onto the bicycle frame, said first brake arm is allowed to pivot about said first bolt while said first spacer is fixed relative to the bicycle fame, said fist mounting assembly firer including a first biasing device including a first return spring carried within said first spacer and a first locking mechanism, said first return spring including a first engagement member extending upwardly from said first spacer and toward said first brake arm upper end, said first locking mechanism including a first screw configured to be mounted on said first brake arm and having a first head configured to engage said first engagement member such that when said first screw is tightened, said first engagement member is tightly positioned between said first screw head and said first brake arm such that when said first brake arm is rotated toward the bicycle wheel and then released, said first return spring biases said first brake arm to an initial position;

a second mounting assembly for mounting said second brake arm to the bicycle, said second mounting device including a second bolt received through said second brake arm lower end and configured to engage the bicycle flame, a second spacer disposed between the second brake arm and the bicycle frame, said second mounting device being configured such that when said second bolt is tightened onto the bicycle frame, said second brake arm is allowed to pivot about said second bolt while said second spacer is fixed relative to the bicycle frame, said second mounting assembly further including a second biasing device including a second return spring carried within said second spacer and a second locking mechanism, said second return spring including a second engagement member extending upwardly from said second spacer and toward said second brake arm upper end, said second locking mechanism including a second screw configured to be mounted on said second brake arm and having a second head configured to engage said second engagement member such that when said second screw is tightened, said second engagement member is tightly positioned between said second screw head and said second brake arm such that when said second brake arm is rotated toward the bicycle wheel and then released, said second return spring biases said second brake arm to an initial position;

a first brake pad mount releasably mounted to said first brake mount above said lower end, said first brake pad mount including a first bracket defining a first slotted opening, said first bracket being disposed orthogonally to said first brake arm and parallel to a plane defined by the wheel, said first slotted opening being oriented in a direction substantially parallel to a radius of the bicycle wheel, said first slotted opening being configured to adjustably mount a conventional brake pad; and a second brake pad mount releasably mounted to said second brake mount above said lower end, said second brake pad mount including a second bracket defining a second slotted opening, said second bracket being disposed orthogonally to said second brake arm and parallel to a plane defined by the wheel, said second slotted opening being oriented in a direction substantially parallel to a radius of the bicycle wheel, said second slotted opening being configured to adjustably mount a conventional brake pad.

13. The bicycle hand brake assembly of claim 1 wherein said first brake arm and said second brake arm are interchangeable one with another between the first and second sides of each of the front and rear wheels of the bicycle.

14. The bicycle hand brake assembly of claim 7 wherein said first brake pad mount is reversible with respect to said first brake arm and wherein said second brake pad mount is reversible with respect to said second brake arm.

15. The bicycle hand brake assembly of claim 8 wherein said first brake arm and said second brake arm are interchangeable one with another between the first and second sides of each of the front and rear wheels of the bicycle.

16. The bicycle hand brake assembly of claim 11 wherein said first brake pad mount is reversible with respect to said first brake arm and wherein said second brake pad mount is reversible with respect to said second brake arm.

17. The bicycle hand brake assembly of claim 12 wherein said first brake arm and said second brake arm are interchangeable one with another between the first and second sides of each of the front and rear wheels of the bicycle.

18. The bicycle hand brake assembly of claim 12 wherein said first brake pad mount is reversible with respect to said first brake arm and wherein said second brake pad mount is reversible with respect to said second brake arm.

* * * * *